April 11, 1961 C. E. KIRCHER, JR., ET AL 2,979,375
DRY-CLEANING APPARATUS AND METHODS OF OPERATION
Filed Aug. 10, 1955 8 Sheets-Sheet 1

INVENTORS:
Charles E. Kircher, Jr. &
Robert J. Jones,
BY Paul & Paul
ATTORNEYS.

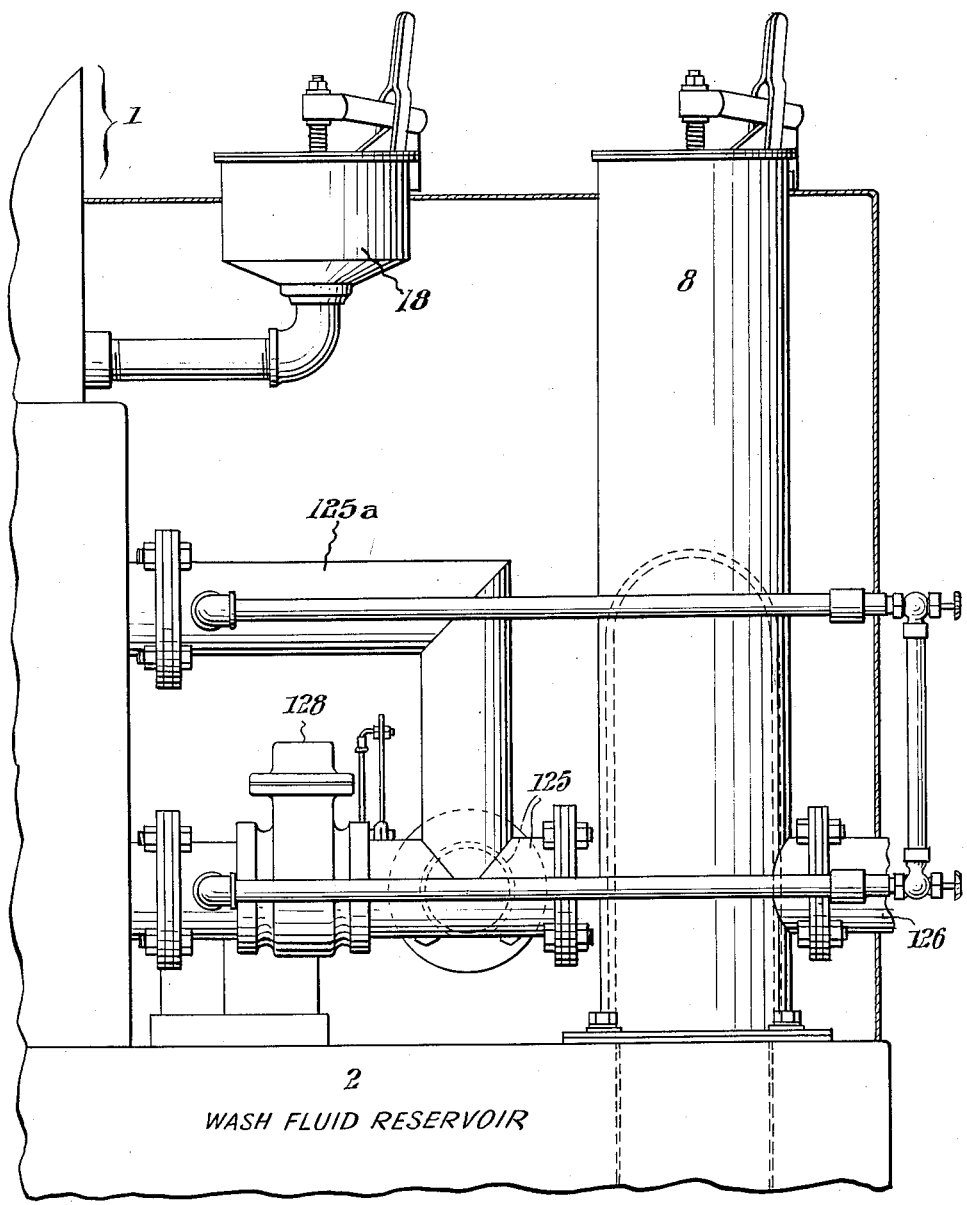

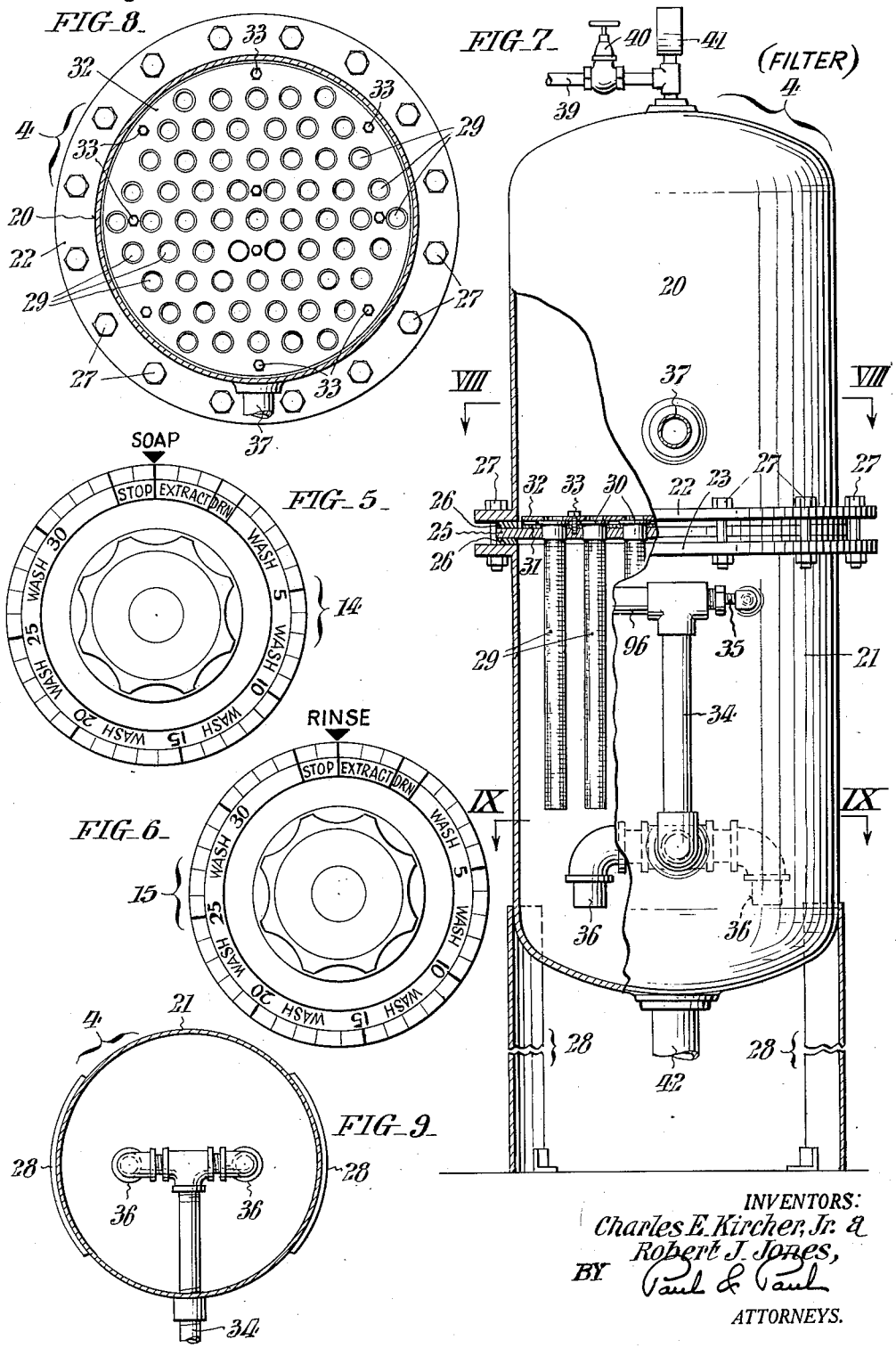

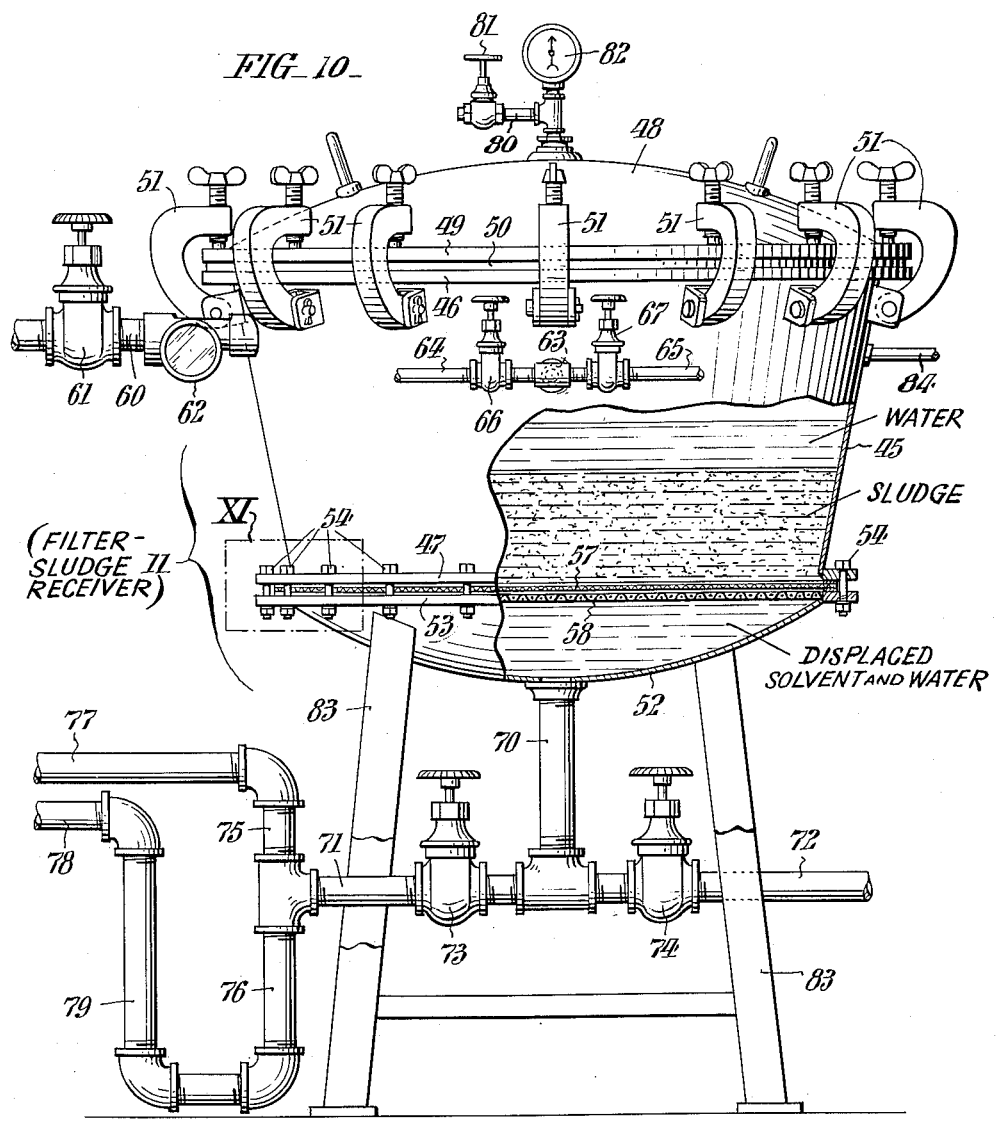
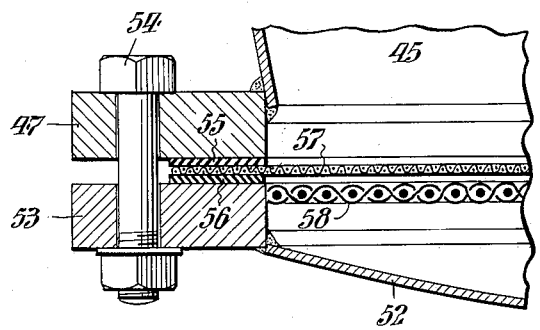

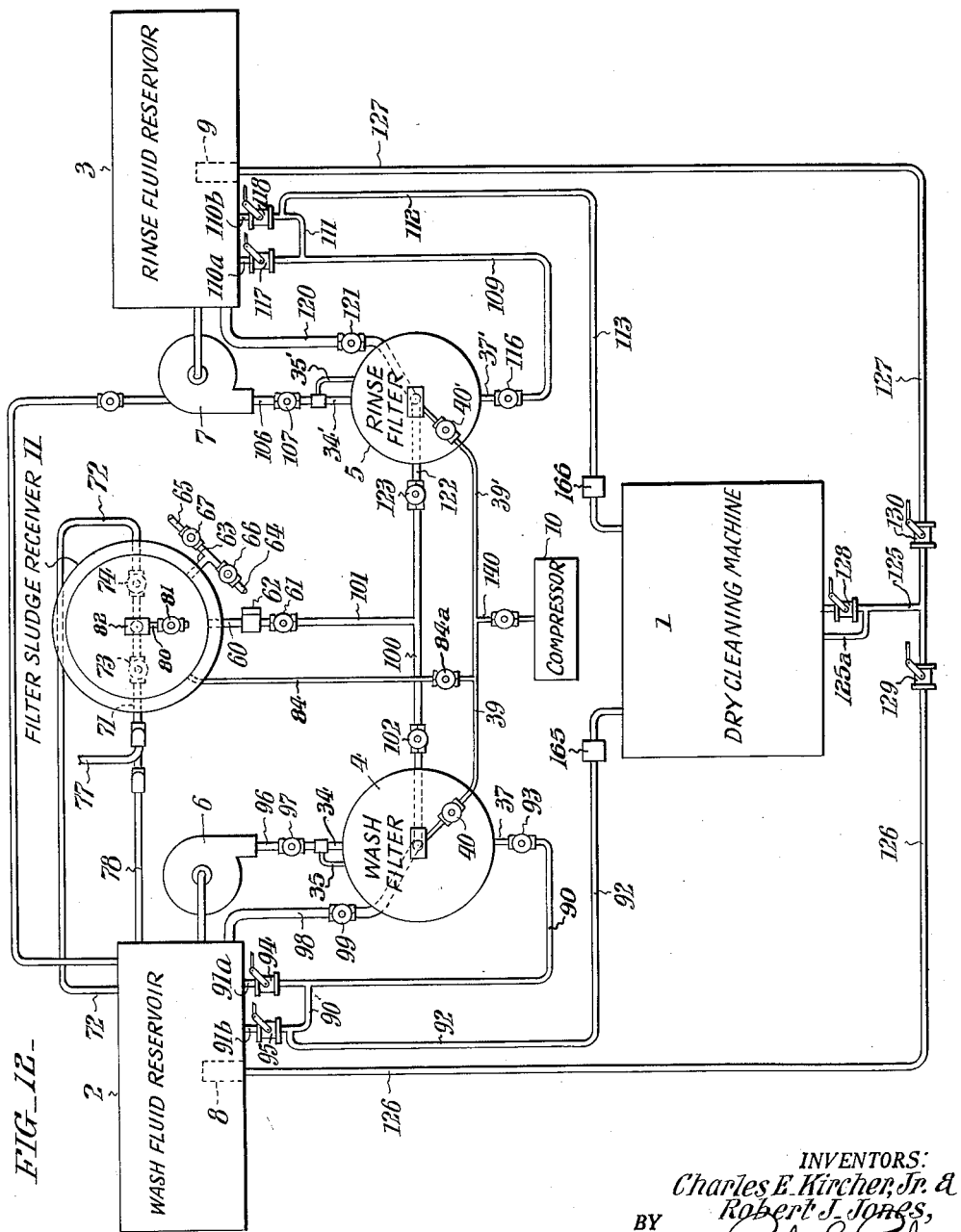

(WASH-EXTRACT CYCLE)

(RINSE-EXTRACT CYCLE)

United States Patent Office 2,979,375
Patented Apr. 11, 1961

2,979,375

DRY-CLEANING APPARATUS AND METHODS OF OPERATION

Charles E. Kircher, Jr., and Robert J. Jones, Detroit, Mich., assignors to Detrex Chemical Industries, Inc., Detroit, Mich., a corporation of Michigan Filed Aug. 10, 1955, Ser. No. 527,514

20 Claims. (Cl. 8—142)

This invention relates to dry-cleaning apparatus and methods of operation. More specifically, it is concerned with apparatus for, and methods of, cleaning clothes and other textile materials by treatment with chlorinated hydrocarbon solvents such as perchlorethylene and the like.

One object of our invention is to provide an automatically-operative apparatus of the kind referred to which is highly efficient not only from the standpoint of power consumption, but highly efficient and economical from the standpoint of solvent filtration and solvent consumption. Broadly speaking, the process is one in which the articles are first treated with a filtered wash solution of solvent mixed with soap or other detergent, then centrifuged for extraction of entrained wash fluid, then treated with filtered rinse solvent and finally centrifuged again for extraction of the entrained rinse fluid.

In connection with dry cleaning apparatus having the above attributes and which includes separate filters for wash and rinse fluids, and individual pump means for circulating the fluids through the respective filters during the respective wash and rinse cycles, it is a further aim of our invention to provide means for automatically and alternately stopping the wash and rinse fluid pumps during the operating cycle. This automatic stopping of these pumps results in removing the filter cake formed at the respective filters and the reforming of the filter cake when the respective pumps are automatically started again after a predetermined time interval.

Another object of our invention is to provide a sludge receiver and solvent extractor, and means operable after the apparatus has been in use for a protracted period, for example, at the end of a day's run, for causing the sludge from one filter to be transferred to the receiver for recovery of the solvent therefrom and delivery of the recovered solvent to the wash fluid reservoir, and for causing the sludge from the other filter to be transferred likewise to the receiver for recovery therefrom of the entrained solvent and delivery of the recovered solvent to said wash fluid reservoir.

Another object of our invention is to provide individual means for admitting compressed air, up to a predetermined pressure, into the individual filters, individual means for momentarily releasing some of the fluid from the bottoms of the filters for forcible dislodgment of the filter cake and accumulated solid deposits from the filtering screens of the filters by action of the compressed air, and thereafter permitting the compressed air to accelerate drainage of the filter sludge to the receiver.

Another object of our invention is to provide means for admitting water or other liquid of suitable specific gravity into the receiver to displace the solvent from the sludge, and means for separating the solvent from the water for delivery to the wash fluid reservoir.

Other objects and attendant advantages will appear from the following detailed description of the attached drawings, wherein:

Fig. 4 is a fragmentary view of the front of the apparatus drawn to a larger scale with part of the casing shown in section.

Figs. 5 and 6 show dials by which the cycles of the apparatus are selected.

Fig. 7 is an elevation of one of the component elements in the form of a filter with a portion thereof broken out and shown in section.

Figs. 8 and 9 are horizontal sectional views of the filters taken as indicated by the angled arrows VIII—VIII and IX—IX in Fig. 7.

Fig. 10 is an elevation of another component element of the apparatus in the form of a filter sludge receiver, with a portion thereof broken out and shown in section.

Fig. 11 is a fragmentary view in section drawn to a larger scale and showing structural details of the receiver in the region indicated by the broken line rectangle XI in Fig. 10.

Fig. 12 is a simplified diagrammatic view showing to better advantage the conduiting between the various components of the apparatus.

The apparatus in general

Figure 1:
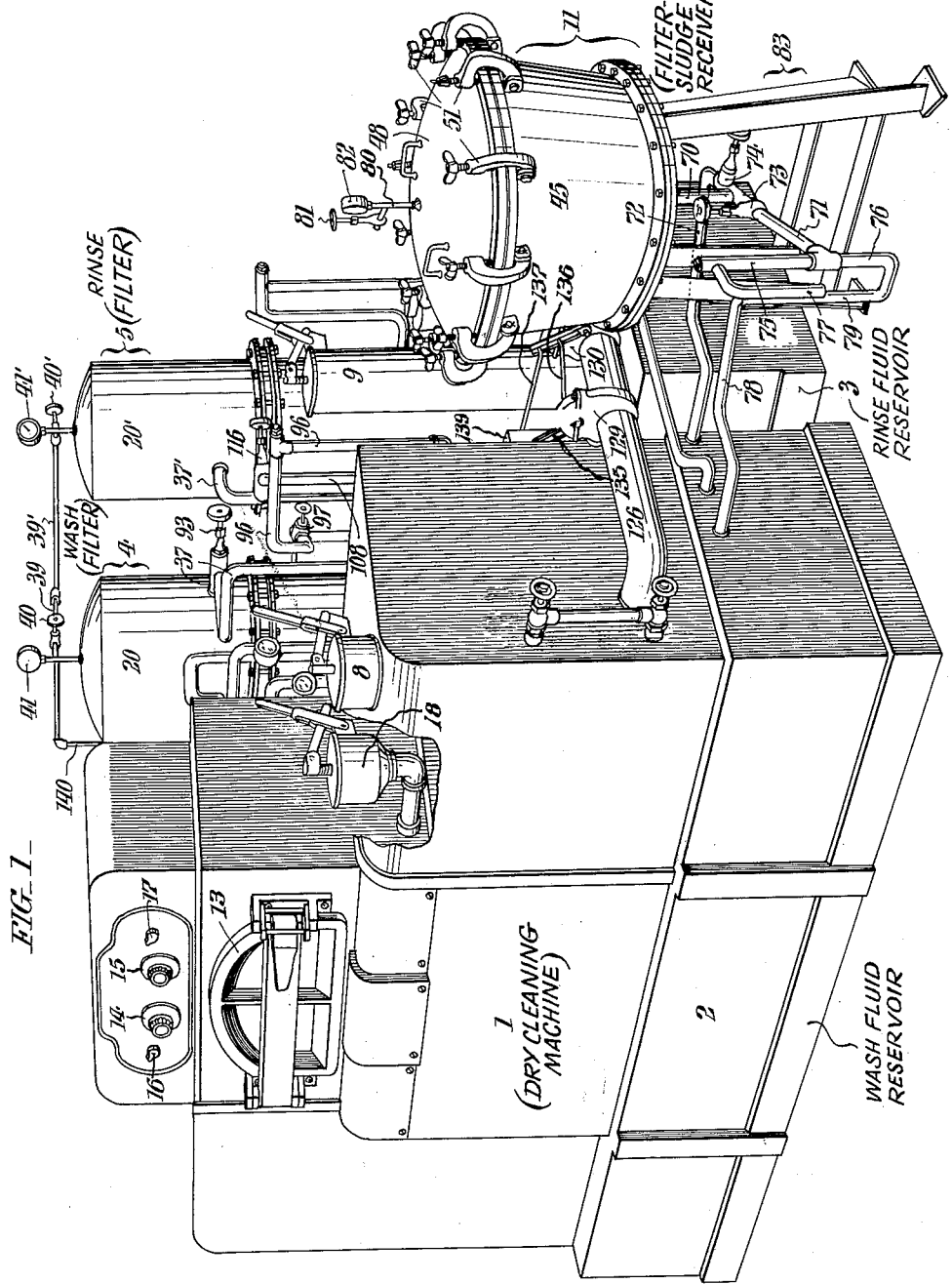
Fig. 1 is a perspective view of a dry cleaning apparatus conveniently embodying the present improvements and suitable for the practice of our improved method.
Figure 2:
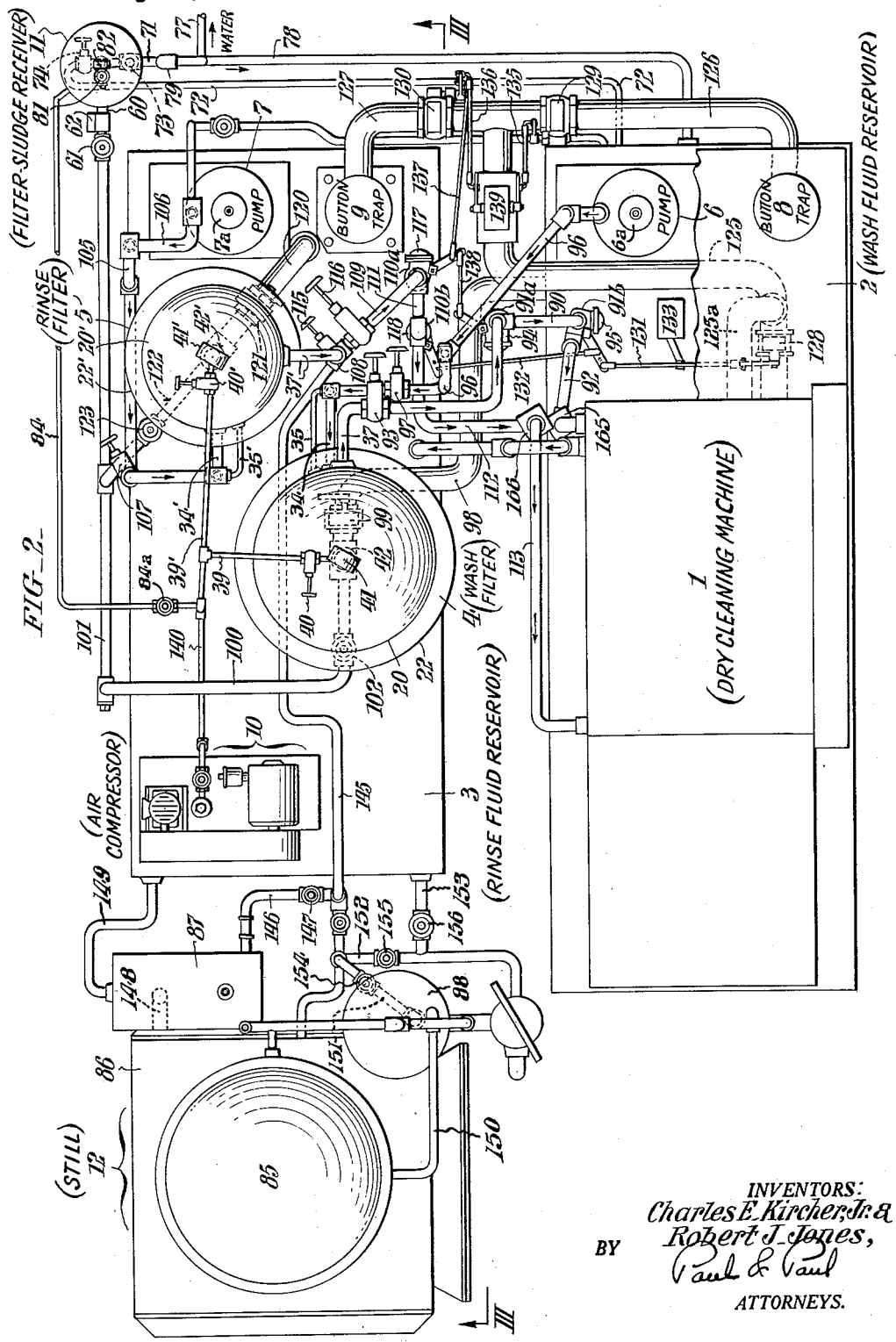
Fig. 2 shows the apparatus in top plan.
Figure 3:
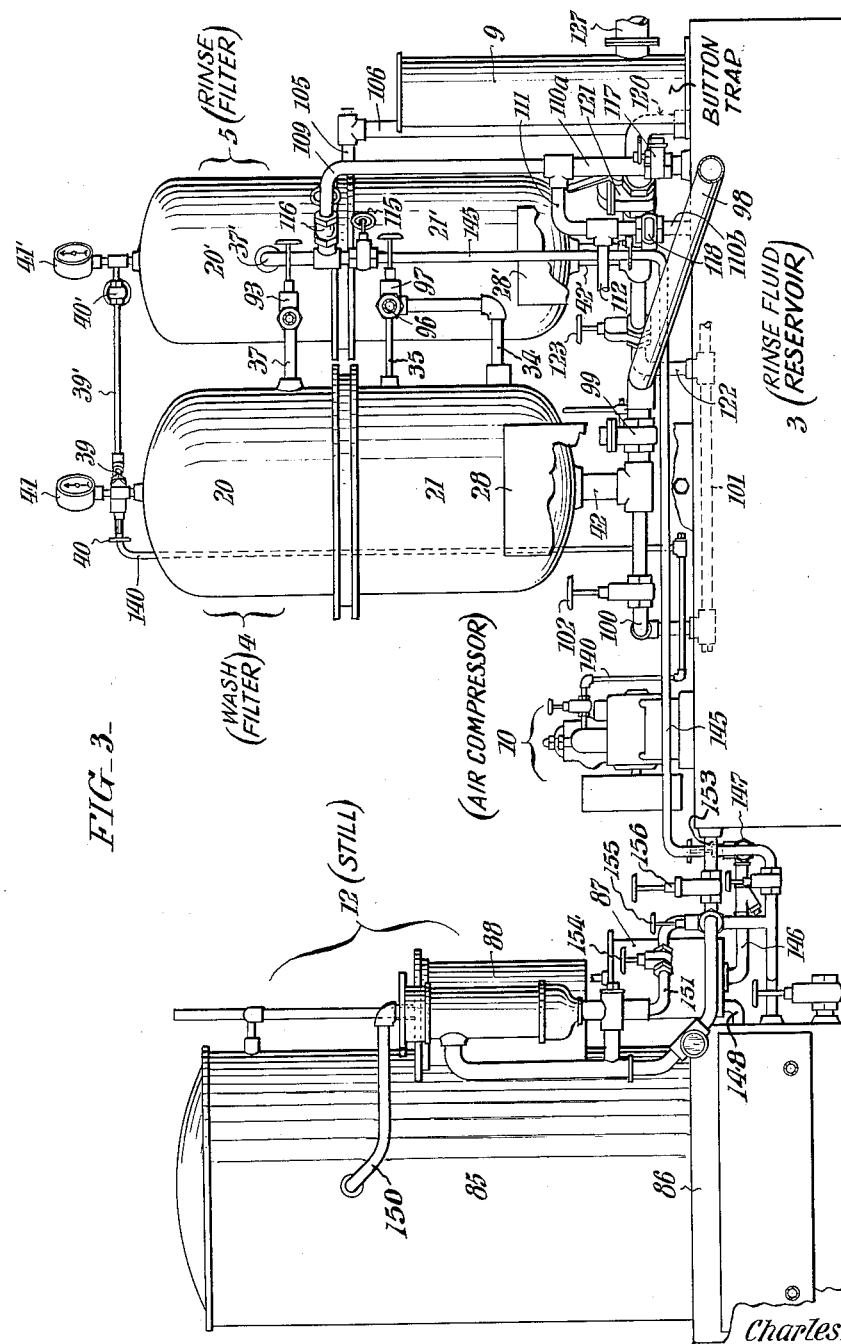
Fig. 3 is a vertical longitudinal section of the apparatus taken as indicated by the angled arrows III—III in Fig. 2.

From Figs. 1-3 of these illustrations, it will be observed that our improved dry cleaning apparatus comprises a dry cleaning machine 1; a storage reservoir 2 for the wash solution; a storage reservoir 3 for the rinse solution; filters 4 and 5 respectively for the wash solution and the rinse solution; pumps 6 and 7 for the wash and rinse fluids respectively mounted on the reservoirs 2 and 3 at one end and arranged to be driven by electric motors 6a and 7a; button traps 8 and 9 also respectively mounted upon the reservoirs 2 and 3 adjacent the pumps 6 and 7; a motor-driven air compressor unit 10 mounted upon the reservoir 3 at the opposite end; a sludge receiver and solvent extractor 11; and a still 12.

The dry cleaning machine

Generally speaking, the dry cleaning machine 1 may be of the type disclosed in U.S. Patent No. 2,574,251, granted to Clarence F. Dinley, having a rotary drum (not shown) for holding the articles to be cleaned, said drum being accessible for loading and unloading upon opening a door 13 (Fig. 1) at the front of the machine housing, and having slow and high speed electric motors for driving the drum during washing, rinsing and extracting cycles. It is to be understood that, through suitable switch and timing means located in the top of the casing of the machine, the washing, rinsing and extraction cycles are automatically carried out. Also at the front of the machine are switch means 16 and 17 for energizing the circuits which automatically provide intermittent operation of the pump motors. As shown in Fig. 4, the machine 1 is provided with a dispenser 18 by way of which soap is introduced into the machine.

The filters

Except for a slight difference in size and capacity, the filters 4 and 5 are substantially identical in construction, the former being separately illustrated in Figs. 7-9. As shown, the filter 4 has a body with reversely-arranged vertically-aligned hollow cylindric upper and lower sections 20 and 21 whereof the confronting open ends are provided with outwardly projecting circumferential flanges 22 and 23 respectively. Extending crosswise of the filter 4 is a flat plate 25 which, with interposition of sealing gaskets 26, is marginally engaged between the flanges 22 and 23 and is held in place, together with said gaskets, by the clamp bolts 27 by which the two sections 20 and 21 of the filter body are united. The filter 4 is supported upright upon the reservoir 2 by legs 28 welded or otherwise affixed at their tops to the lower body section 21. The plate 25 has multiple apertures through which filter tubes 29 of wire mesh are set, said tubes being closed at their bottom ends, and being provided at their upper ends with stop flanges 30 which are restrained by a discoid retaining gasket 31 having apertures like those of said plate 25. The tubes 29 are held in place by a clamp plate 32 which is secured to the plate 25 by cap screws 33 and of which the apertures are of smaller diameter to marginally lap the stop flanges 30 of said tubes.

As hereinafter more fully explained, the wash fluid is normally introduced into the filter 4 by way of a conduit 34 which, together with a smaller bleeder by-pass pipe 35, connects into the lower body section 21 at a level somewhat above the bottom of the latter and which terminates within the filter in two lateral downwardly-open branches 36. Connecting into the upper section 20 of the filter above the plate 25 is a conduit 37 through which the wash fluid, after being filtered, is discharged. Connecting into the top of the upper section 20 of the filter body is a pipe 39 through which compressed air can be introduced under control of a hand valve 40, said pipe being fitted with a pressure gauge 41; and connected into the bottom of the lower section 21 is a sludge drain conduit 42. As before stated, the rinse fluid filter 5 is substantially identical with the wash fluid filter 4, and accordingly, in order to preclude the necessity for repetitive description, all the appurtenances associated with it and having their counterparts in said wash fluid filter, are identified in Figs. 1–3 and 12 by the same reference numerals with addition of a prime, in each instance, for more ready distinction.

*The sludge receiver*

As separately illustrated in Figs. 10 and 11, the sludge receiver and solvent extractor 11 has a body section 45 which is of downwardly-tapering frusto-conical configuration, and which is provided at the top and bottom with circumferential flanges 46 and 47 respectively. The retractable domed cover 48 of the receiver 11 has a flange 49 matching the top flange 46 of the body section and is held in place, with interposition of a sealing gasket 50, by a number of pivoted screw clamps 51. The concaved bottom 52 of the receiver has a circumferential flange 53 matching the lower flange 47 of the body section 45. A screen diaphragm 57 of fine mesh is marginally clamped between the flanges 47 and 53 by means of bolts 54, with interposition of sealing rings 55 and 56 (see Fig. 11). Sagging of the diaphragm 57 is prevented by a heavier supporting screen or grid 58 of coarser mesh whereof the peripheral edge is welded to the receiver bottom 52. The sludge from the wash fluid filter 4 is introduced into the body of the receiver by way of a conduit 60 wherein is interposed a hand valve 61 and a sight glass or "visiflow" 62. Also connecting into the body of the receiver adjacent the top is a conduit 63 through which water or other displacing liquid can be introduced to displace the solvent from the sludge as hereinafter more fully set forth, said conduit having oppositely extending branches 64 and 65 respectively provided with normally closed hand valve 66 and 67. Connected into the bottom 52 of the receiver is a drain conduit 70 with oppositely extending branches 71 and 72 in which normally closed hand valves 73 and 74 are interposed. The conduit 71 has short vertical sections 75 and 76 from the upper of which leads a horizontal line conduit 77 at a level above another line conduit 78 which, through a drop loop 79, connects with the section 76. The loop 79 serves as a means for separating displacement water from the screened drainage of the receiver, the entrained solvent, being the heavier, passing off through the line conduit 78 and the water rising and passing off through the line conduit 77 at the higher level. Connecting into the cover 48 of the receiver is a pipe 80 provided with a hand valve 81 and a pressure gauge 82. As shown, the receiver 11 is provided with legs 83 by which its body is supported at a suitable elevation from the rinse fluid reservoir. Also connecting laterally into the receiver 11 is a pipe 84 through which compressed air can be introduced for a purpose explained later under control of a hand valve 84a.

The unique principle of solvent recovery from filter sludge on which the above described unit is based is that a liquid of lower specific gravity than the solvent when placed on top of the sludge cake will displace the solvent from the cake as it flows by gravity or under imposed pressure down through the bed of solids. The lower specific gravity displacing liquid may be either miscible or immiscible with the solvent to be displaced. In general higher recovery of solvent is realized when the displacing liquid is miscible with the solvent. For example, if water is used to displace perchlorethylene from filter sludge, the maximum recovery of solvent is 75–85%. However, if methanol, ethylene glycol or a petroleum oil is used, solvent recovery is in the range of 90–100%.

Solvent recovery is by liquid displacement and not by extraction even when a miscible displacing liquid is used as shown by the fact that as the process proceeds the recovered solvent is essentially free of the displacing liquid until the interface between the two liquids has advanced to the bottom of the cake. Then, for a short time, a mixture of the two liquids comes off leaving behind a cake essentially stripped of solvent.

*The still*

The still 12, see Figs. 2 and 3, comprises a tank 85 which is mounted on a base 86 containing a suitable heating unit (not illustrated), a level control 87, and an after-cooler 88. These elements may be of any approved construction and are not to be regarded, per se, as parts of the present invention except for their functioning in association with the other units of the apparatus hereinbefore described.

*Conduit connections*

By reference again to Figs. 1–3 and 12 it will be noted that the wash filter 4 communicates with the dry-cleaning machine 1 by way of the conduit 37 and connecting sections 90, 91a, 91b and 92, the sections 91a and 91b extending down into the reservoir 2. As shown, the conduit 37 is provided with a hand valve 93; and the sections 90 and 91 with motor operated valves 94 and 95 respectively. The inlet conduit 34 of the filter 4 is connected to the pump 6 by continuing sections 96, said conduit 34 being provided with a hand valve 97. Conduit 34 is provided with an extension 35 which connects into filter body 21. An extension 98 leading from the drain pipe 42 at the bottom of the filter 4 connects into the side of the wash fluid reservoir 2 and interposed therein is a manually-operable valve 99. Also connecting with the drain conduit 42 of the filter 4 is an extension 100 which is joined to a line conduit 101 which is connected, in turn, to the inlet conduit 60 of the sludge receiver 11, sludge flow to the receiver being controllable by means of the hand valve 102 interposed in said conduit extension 100.

The inlet 34' of the rinse filter 5 is connected through joining sections 105 and 106 with the pump 7, said conduit 34' being provided with a hand valve 107. The outlet conduit 37' of the rinse filter 5 is connected through extensions 108, 109, 110a, 110b, 111, 112 and 113 to the dry-cleaning machine 1. Sections 110a and 110b extend down into reservoir 3. Hand valve 116 is provided in the conduit section 109, and the sections 109 and 111 are provided with motor operated valves 117 and 118 respectively. The outlet 42' at the bottom of the rinse filter 5 is joined to a conduit 120 which is connected into the top of the reservoir 3 and which is provided with a manually operable valve 121. Another conduit 122 joined to the bottom outlet 42' of the filter 5 connects with the line conduit 101 and is provided with a hand valve 123.

Extending from the dry-cleaning machine 1 is a conduit 125 which joins with a conduit having branches 126 and 127 respectively connecting into the wash and rinse reservoirs 2 and 3 through button traps 8 and 9. The conduit 125 is provided with a motor operated valve 128, and the branches 126 and 127 with motor operated valves 129 and 130 respectively. By means of links 131 and 132, the operative levers of the valves 128, 95, and 118 are connected for actuation in unison by an electric motor means indicated at 133. Similarly, the operating levers of the valves 129, 130, 117 and 94 are connected together by links 135, 136, 137 and 138 for simultaneous actuation by an electric motor means designated 139. Also extending from the machine 1 is an overflow pipe 125a which connects with the pipe 125 beyond the valve 128.

Compressed air is conducted from the compressor unit 10 through a pipe 140 to which the air induction pipes 39 and 39' respectively of the filters 4, 5 are joined. As shown, the pipe 78 leading from the water separator 79 associated with the sludge receiver 11 connects into the wash fluid reservoir 2.

As further shown, a line conduit comprising the sections 145 and 146 extends from the conduit 108 to the level control 87 at the still 12, the section 146 being provided with a hand valve 147, and section 145 provided with a hand valve 115. A pipe 148 connects the tank 86 of the still 12 to the level control 87, overflow from level control 87 can drain back into the rinse fluid reservoir 3 by way of a pipe 149. The effluent from the still tank 85 passes through a pipe 150 to the after cooler 88 from which a drain pipe composed of sections 151, 152 and 153 extends to the rinse fluid reservoir 3, said sections being provided respectively with hand valves 154, 155 and 156.

*Start-up procedure*

In preparation for the use of the apparatus, both timer dials 14 and 15 at the front of the machine 1 are set to "Stop" position. All hand valves except the valves 93, 97, 107 and 116 are closed, and all the automatic valves except the valves 94 and 130 are open. With this preparation, both of the switches 16 and 17 are turned to "On" position. The wash timer is then set to five minutes on "Wash," and, when the tub of the dry-cleaning machine is full, a definite quantity of filter powder is introduced into the button trap 8 and the timer dial 14 allowed to run through "Wash," "Drain" and "Extract" to "Stop" position, the wash filter 4 being thereby pre-coated. The rinse timer dial 15 is next set to "Wash," and when the machine 1 is full, a definite quantity of filter powder is introduced into the button trap 9 and said timer dial allowed to run through "Wash," "Drain" and "Extract" to "Stop" position as a result of which the rinse filter 5 is pre-coated.

*Operation*

All being now in readiness, the machine 1 is charged with a batch of clothing or other textile articles to be cleaned, and the door 13 of the machine is closed.

With both timer dials set at "Stop" position, the motor-operated valves 95, 117, 118, 128 and 129 are open and the motor-operated valves 94 and 130 are closed, the wash and rinse fluids, being thus pumped, for the time being, from the reservoirs 2 and 3 through the conduits 96, 34, 106 and 34' to the filters 4 and 5 respectively, and the effluent from the filters passing through the conduits 37, 90, 91b and 37'; 109, 110a, 111, 110b back to said reservoirs respectively. As described hereinafter this flow is not continuous but is interrupted automatically at predetermined times and for predetermined time intervals as the process proceeds.

The soap timer dial 14 and the rinse timer dial 15 (in that order) are set to the desired washing times, when motor-operated valves 95, 118 and 128 close automatically, so that wash fluid is diverted from the wash reservoir 2 to fill the machine 1 through the conduiting 37, 90, 92. At the same time, the drum of the machine begins to rotate at slow speed. When the tub is full, the excess wash fluid overflows through the conduiting 125a, 125, 126 back to the reservoir 2 through button trap 8.

When the soap timer dial reaches "Drain" position, the motor operated valves 95, 118 and 128 open automatically for draining of the wash solution from the machine 1 back to the wash solution reservoir 2 and again diverting the wash solution flow to the tub by-pass pipe 91b.

After the machine 1 has drained and the soap timer dial 14 reaches "Extract" position, the drum motor is automatically stopped and the extract motor is started to increase the drum speed for expulsion of the excess wash solution from the garments by centrifugal action. During this stage, the wash pump 6 is stopped automatically for a predetermined time period sufficiently long to insure that some of the wash fluid drains away from the wash fluid filter 4. Part of the wash fluid flows back to the reservoir 2 through the pump 6 and this causes a sloughing off of the filter cake previously deposited on the screen elements of the filter. The drainage of wash fluid from the wash filter 4 back through the pump and into the reservoir 2 is interrupted when the liquid level in the filter 4 drops to the level of the opening to pipe 35 since air in this line stops the siphoning action which otherwise would lower the liquid to that of pipe 36. When the soap timer dial reaches "Stop" position, the wash pump 6 is started again and circulation through the filter is resumed, thus depositing a new filter cake on the tubes 29 of the wash filter 4. Means are thus provided for automatically removing the filter cake during a part of each complete cleaning cycle and then reforming the filter cake. This is accomplished automatically by interrupting the liquid flow through the filter and discontinuing all liquid flow communication between the pump and the filter. As hereinafter described, the same discontinuance of liquid flow communication between the rinse liquid pump and the rinse filter is automatically carried out during each cleaning cycle. At the same time the extract motor of the machine is stopped and the drum motor resumes rotation at slow speed. Also at the same time, the motor-operated valves 94 and 130 are opened, and the motor-operated valves 95, 117, 118, 128 and 129 are closed automatically whereby rinse fluid from the reservoir 3 is diverted to the tub of the machine 1 through the conduiting 37', 109, 111, 112, 113 and the tub allowed to fill. When the tub is filled the rinse fluid overflows through the conduiting 125a, 125, 127 back to the reservoir 3 through button trap 9.

When the rinse timer dial 15 reaches "Drain" position, the motor-operated valves 95, 118 and 128 are opened automatically and the tub of the machine 1 is thereby allowed to drain through the conduiting 125, 127 back to the reservoir 3 and again diverting rinse solvent to by-pass the pipe 110b.

After the tub of the machine 1 has drained and the rinse timer dial 15 reaches "Extract" position, the tumbler motor is stopped automatically and the extract motor is started to increase the drum speed for removal of the excess rinse fluid from the garments by centrifugal force. At the same time the rinse pump 7 is stopped automatically for a predetermined time period sufficiently long to insure that some of the rinse liquid drains away from the rinse filter 5. Stopping the liquid flow from the pump 7 to the filter 5 causes a sloughing off of the previously formed filter cake.

When the rinse timer dial 15 reaches "Stop" position, the rinse pump 7 is automatically started again for redeposit of the filter cake on the tubes of the rinse filter 5. At the same time the extract motor is stopped and the brake applied to stop drum rotation; the motor-operated valves 117 and 129 are opened automatically; and the motor-operated valves 94 and 130 are closed automatically, thereby leaving the apparatus ready for the next washing cycle. The garments are then removed from the machine 1 and may be placed in an auxiliary extractor (not shown) for recovery therefrom of any remaining solvent, and such recovered solvent returned to the reservoir 3.

*Filter clean-out procedure*

At the end of a day's operation of the apparatus, the valves 93, 97, 107 and 116 will be open, and all the other hand operated valves will be closed. In preparation for cleaning the filter 4, the sludge receiver inlet valve 61 and vent valve 81 are opened. The valve 93 is closed to allow the air in the filter dome to be compressed to the full pressure of the pump, whereupon the valve 97 is closed. The air compressor 10 is started and its valve opened; and the valve 40 is opened to the conduits 39 and 140 until the desired head pressure is reached. Then the valve 102 is opened with creation of a "bump" effect by the action of the compressed air head within the top of the filter, as a result of which the filter aid sludge accumulation is forcibly dislodged or sloughed from the filter tubes. The air valve 40 is still open and, as a consequence, the solvent and the filter sludge are displaced into the sludge receiver 11 by way of the conduiting 100, 101, and 60. The filtered solvent passes through the screens 57 and 58 of the receiver and returns to the reservoir 2 through the pipe 72. This phase is permitted to continue until the "visi-flow" 62 shows no further flow. The filter inlet valve 97 is then opened for about three seconds for flushing of the filter bottom and time allowed for air to displace the flushed solvent into the sludge receiver 11. The circulating pump may then be turned off. The valves 61, 102, and 40 are closed and the compressor 10 is turned off. The filter and the tubes are then clean and ready for the next day's operation.

As required, the rinse filter 5 may be cleaned according to the same general procedure detailed above for the soap filter 4.

*Pump control*

Figure 13:
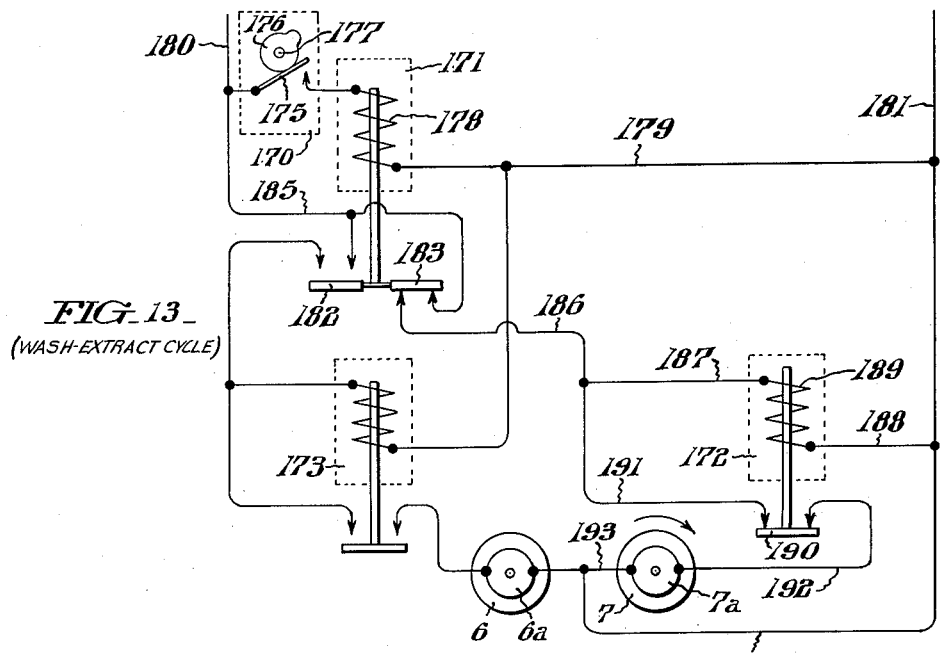
Figs. 13 and 14 are wiring diagrams of the means provided for controlling the operation of the pump motors.
Figure 14:
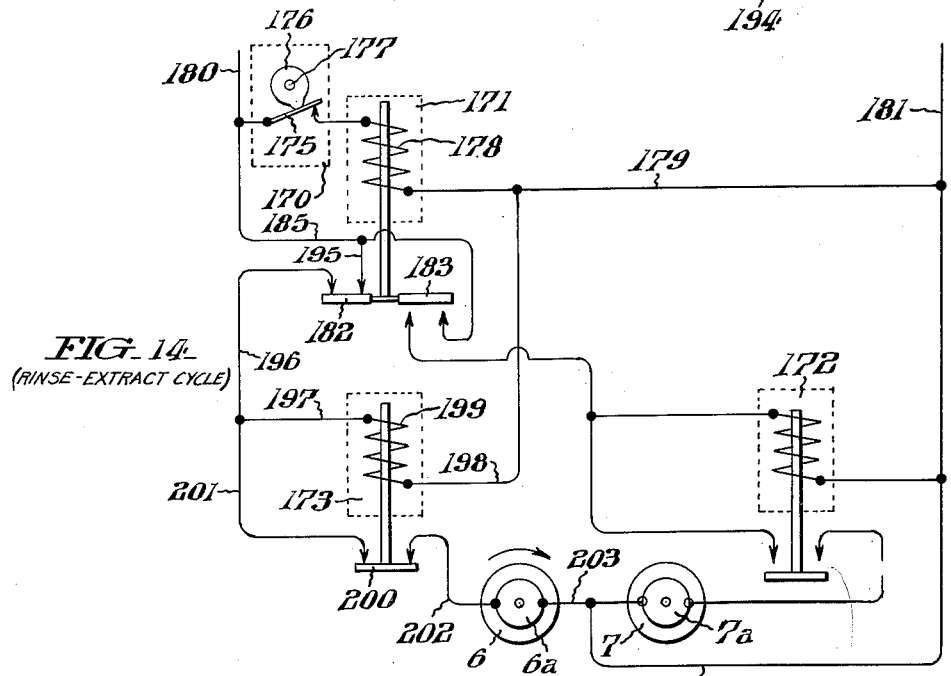

For controlling the pump motors 6a and 7a in the order hereinbefore explained, means such as illustrated in Figs. 13 and 14 may be utilized. As shown, this means comprises a suitably driven timer conventionally indicated at 170 and three relays 171, 172 and 173. A switch 175 operable by a cam 176 on the shaft 177 of the timer 170 is interposed, with the coil 178 of relay 171, in a conductor 179 connected across the mains 180 and 181 of an electric power line. The armature of the relay 171 carries two contacts 182 and 183. When relay 171 is de-energized as in Fig. 13, the contact 183 closes a circuit 185, 186, 187, 188 in which the coil 189 of relay 172 is interposed. As the relay 172 is energized, the contact 190 on its armature closes a circuit 185, 186, 191, 192, 193, 194 containing the pump motor 7a. When the switch 175 is closed as in Fig. 14, the relay 171 is energized whereby the contacts 182 and 183 are lifted as a result of which, the circuit through the coil of relay 172 is broken with attendant opening of the circuit of pump motor 7a. At the same time however, through lift of the contact 182 of the relay 171, a circuit 195, 196, 197, 198 through the coil 199 of relay 173 is closed, with establishment, by the contact 200 on the armature of the latter, of a circuit 201, 202, 203, 194 in which the motor 6a of the wash fluid pump 6 is interposed.

An alternate and completely satisfactory way of automatically stopping and starting the pump motors 6a and 7a is to use, instead of the relays described above, a separate timer switch interposed in each motor circuit. The timer switch is provided with a cam which can be adjusted to open or close the pump motor circuit at any predetermined time during its operating cycle.

Having thus described our invention, we claim:

1. A method of recovering water-immiscible solvent from filter aid sludge, comprising the steps of backwashing the sludge from the filter by reverse flow of solvent through said filter, intercepting said sludge in an auxiliary filter, and passing water through the sludge in said auxiliary filter to displace solvent from the sludge.

2. A method of recovering water-immiscible solvent of a density greater than water from filter aid sludge, comprising the steps of backwashing the sludge from the filter by reverse flow of solvent through said filter, intercepting said sludge in an auxiliary filter, and passing water downwardly through the sludge to displace solvent downwardly from the sludge, by super-imposing an overlying body of water above and upon said sludge.

3. A method as defined in claim 2 including, in combination therewith, the further step of separating the displaced solvent phase from any water carried therewith.

4. In a method of filtration of a water-immiscible solvent wherein a main filter intercepts soil from said solvent in the form of filter aid sludge, the steps comprising backwashing the sludge, under pressure, through an auxiliary filter whereby the sludge is accumulated in said auxiliary filter, displacing the solvent from the solvent-carrying sludge with water, and thereafter separating the solvent and the water phases.

5. In a method of filtration of a water-immiscible solvent having a density greater than water wherein a main filter intercepts soil from said solvent in the form of filter aid sludge, the steps comprising backwashing the sludge, under pressure, through an auxiliary filter whereby the sludge is accumulated in said auxiliary filter, displacing the solvent downwardly from the solvent-carrying sludge with water, by superimposing an overlying body of water upon said sludge, and thereafter separating the solvent and the water phases.

6. A method of recovering residual chlorinated hydrocarbon solvent from dry cleaner filter sludge having said hydrocarbon solvent entrained therein, said method comprising the steps of charging a closed vessel having a retaining screen across the bottom thereof, with a quantity of the filter sludge and solvent mass; introducing water into the vessel above the sludge charge; and thereafter causing the water to penetrate the sludge arrested on the screen and to displace the residual solvent from the sludge, said displaced solvent passing through the screen and through an outlet at the bottom of the vessel; and finally withdrawing the treated sludge residue from the receptacle and discarding it as waste.

7. The method defined in claim 6, including the further step of introducing an inert gaseous pressure medium into the vessel above the water to accelerate displacement of the solvent from the sludge.

8. The method defined in claim 6, including the further step of separating the solvent from portions of the water which may pass through the screen.

9. In a dry cleaning system using a water-immiscible solvent having a density greater than water, solvent filtration means including a main filter, primary flow control means for normally directing a stream of solvent through said main filter from an entry side to a discharge side including a pump for maintaining said stream under pressure, an auxiliary filter chamber, an auxiliary filter in said chamber, by-pass means normally rendered inoperative for establishing liquid flow communication between the entry side of said main filter and said chamber, secondary flow control means for reversing said stream and for simultaneously rendering said by-pass means operative whereby the stream is caused to flow from the discharge side of said main filter through said main filter and thence to and through said chamber and said auxiliary filter so as to backwash filter sludge from said main filter into said auxiliary filter, and means for delivering water to the upper end of said chamber to provide an overlying layer of water above said sludge, and means for withdrawing downwardly displaced solvent from the sludge in said auxiliary filter.

10. Filtration means as defined in claim 9 wherein further means is provided for separating the displaced solvent phase from any water carried therewith from said auxiliary filter chamber.

11. In a dry cleaning system, using a water-immiscible solvent of a density greater than water, solvent purification means including a main filter housing having a main filter element therein, means for normally directing a stream of solvent into said filter housing and through said main filter element from an inlet side to an outlet side thereof including a pump for maintaining said stream under pressure, discharge means for normally permitting discharge of filtered solvent from said main filter housing, an auxiliary filter housing including an auxiliary filter element, bypass means normally rendered inoperative, but, when operative, permitting solvent flow from said main filter housing, on the inlet side of said main filter element to said auxiliary filter housing, and means for reversing normal solvent flow through said main filter housing whereby solvent is caused to pass under pressure from said outlet side through said main filter element to said inlet side thereof and means for simultaneously rendering said bypass means operative whereby solvent with entrained filter sludge separated from the inlet side of said main filter element is thereupon backwashed into said auxiliary filter housing, said sludge being intercepted by said auxiliary filter element, means for delivering water to the upper end of said auxiliary filter housing to provide an overlying layer of water above said sludge, and for simultaneously rendering said by-pass means inoperative, and means for withdrawing displaced solvent downwardly from said auxiliary filter housing.

12. Solvent purification means as defined in claim 11, wherein additional means is provided for separating the solvent phase from the water phase.

13. A method of dry cleaning comprising the steps of idly circulating a solvent-detergent wash liquid containing a quantity of filter aid, between a supply reservoir and an up-flow filter, and circulating rinse liquid of dry cleaning solvent, also containing a quantity of filter aid, between a separate supply reservoir and a separate up-flow filter; loading a rotary machine with material to be cleaned; starting the machine and diverting wash liquid thereto from the wash liquid filter; stopping the machine, interrupting delivery of wash liquid thereto and draining the machine; re-starting the machine, upon expiration of a predetermined time interval, for extraction of entrained wash liquid from the material and stopping circulation of wash liquid between the wash liquid reservoir and the wash liquid filter; re-starting the machine upon expiration of another predetermined time interval, resuming circulation of wash liquid between the wash reservoir and the wash liquid filter, and diverting rinse liquid from the rinse liquid filter to the machine; stopping the machine after lapse of another predetermined time interval and draining the rinse liquid therefrom; re-starting the machine upon expiration of another predetermined time interval for extraction of entrained rinse liquid from the material, and interrupting circulation of rinse liquid between the rinse liquid reservoir and the rinse liquid filter; and finally, after the expiration of another predetermined time interval, resuming circulation of rinse liquid between the rinse liquid reservoir and the rinse liquid filter, stopping the machine and removing the cleaned material therefrom, including the further steps of separately transfering accumulated filter aid sludge from the respective filters to a sludge receiver after repetitions of wash-rinse cycles over protracted periods; separately adding liquid of lower specific gravity than the solvent to displace the solvent from the sludge; draining the receiver, and separating the solvent from displacing liquid; and returning the solvent so recovered to the reservoir.

14. In a dry cleaning apparatus, a dry cleaning machine having a rotary drum for the material to be cleaned, motor means for rotating the drum, and means for starting and stopping the motor means to carry out successive treating cycles; a storage reservoir for chlorinated solvent such as perchlorethylene to which a quantity of filter aid in powder form has been added; an upright up-flow filter having screen means positioned medially of its height; a conduit extending from the reservoir and connected to an inlet to the lower part of the filter; a conduit extending to the machine from an outlet of the filter positioned at the top half thereof; a conduit extending from the machine to the reservoir; a pump in the first mentioned conduit for drawing solvent from the reservoir and causing it to traverse the filter and the machine before return to the reservoir during each treating cycle; a drain conduit having a normally closed valve therein and extending from the machine to the reservoir; automatic timing means for opening the valve to permit the machine to drain at the end of each cycle, and automatic means for stopping the pump for a time sufficient to permit part of the solvent to flow from the filter back into the reservoir by way of the first mentioned conduit and thereby break liquid flow communication between the pump and the inlet side of the filter during a portion of each cycle whereby clinging filter aid is sloughed from the filter screen by interrupting the liquid flow and allowing solvent gravitation through the screen from the top of the filter to the inlet side thereof; a sludge receiver; a conduit with a normally closed valve therein extending from a drain outlet at the bottom of the filter whereby, upon opening of said valve after protracted use of the apparatus, the sludge is permitted to pass to the sludge receiver; means for admitting a quantity of water or other displacing liquid into the sludge receiver to displace the solvent from the sludge; and a conduit leading from the receiver to the reservoir and having therein a normally closed valve and a water separator whereby, upon opening the last mentioned valve, the displacing water can be separated by gravity from the solvent and the recovered solvent conducted to the reservoir.

15. Dry cleaning apparatus according to claim 14, further including a source of compressed air; a pipe leading from said source into the top of the filter and having a normally closed valve therein whereby compressed air can be admitted to insure complete displacement of the sludge from the filter into the receiver.

16. Dry cleaning apparatus according to claim 14, further including a source of compressed air; a pipe leading from said source into the top of the filter and having a normally closed valve therein whereby compressed air can be admitted to insure complete displacement of the sludge from the filter into the receiver; a pipe also extending from the compressed air source into the top of the receiver and likewise having a normally closed valve therein whereby, upon opening of such valve, compressed air can be admitted into the receiver to insure complete displacement of the solvent or water from the sludge cake.

17. In a dry cleaning apparatus, a dry cleaning machine having a rotary drum for the material to be cleaned, motor means for rotating the drum, and means for starting and stopping the motor means to carry out successive treating cycles; a storage reservoir for wash fluid consisting of chlorinated hydrocarbon such as perchlorethylene containing soap and to which a definite quantity of filter aid in powder form has been added; an upright up-flow filter for the wash fluid having screening means substantially medially of its height; a conduit extending from the reservoir to an inlet of the filter at a level somewhat below the screen means therein; a conduit extending from an outlet adjacent the top of the filter to the machine; a conduit extending from the machine to the reservoir; a pump in the first mentioned conduit for drawing wash fluid from the reservoir and causing it to traverse the filter and the machine before return to the reservoir during the wash phase of each cycle; a drain conduit extending from the machine to the reservoir and having a normally closed valve therein; automatic timing means for opening the valve to permit the machine to drain at the end of a wash phase of each cycle and automatic means for stopping the pump during each cycle for a time sufficient to permit part of the wash fluid to drain back into the reservoir by way of the first mentioned conduit and thereby break liquid flow communication between the pump and the inlet side of the filter; a separate reservoir for rinse fluid consisting of said chlorinated hydrocarbon to which a definite quality of filter aid has been added; a separate up-flow filter for the rinse fluid; similarly arranged conduits between the rinse fluid reservoir and the rinse fluid filter, between the rinse fluid filter and the machine, and between the machine and the rinse fluid reservoir, and a pump for drawing rinse fluid from the rinse fluid reservoir and causing it to traverse the rinse fluid filter and the machine before return to the rinse fluid reservoir during the rinse phase of each cycle; means controlled by the timing means for again opening the valve aforesaid in the machine drain conduit at the end of the rinse phase of the cycle and for stopping the last mentioned pump during each cycle for a time sufficient to permit part of the rinse fluid in the rinse fluid filter to flow back into the rinse fluid reservoir and thereby break liquid flow communication between the pump and the inlet side of the filter before starting of another cycle, whereby clinging filter cake is sloughed from the screening in the rinse fluid filter by gravitational reverse flow of rinse fluid through said screening from the top of said filter to the inlet side thereof; a sludge receiver; conduits with normally closed valves therein extending from drain outlets at the bottoms of the wash fluid filter and the rinse fluid filter respectively whereby, upon selective opening of the valves after protracted use of the apparatus, the sludge is permitted to pass from one or the other of the two filters into the sludge receiver; means for admitting a quantity of water or other displacing liquid into the receiver to displace the solvent from the sludge; and a drain pipe with a normally closed valve and a water separator therein leading from the receiver to the wash fluid reservoir whereby, upon opening the last mentioned valve, the solvent and water are separated by gravity and the recovered solvent is conducted to the wash fluid reservoir.

18. Dry cleaning apparatus according to claim 17, further including a source of compressed air; a pipe leading from said source and having branches with normally closed valves therein connecting into the tops of the respective filters whereby compressed air can be admitted into the filters to insure complete displacement of the sludge from said filters to the sludge receiver.

19. Dry cleaning apparatus according to claim 17, further including a source of compressed air; a pipe leading from said source and having branches with normally closed valves therein connecting into the tops of the respective filters whereby compressed air can be admitted to insure complete displacement of the sludge from said filters to the sludge receiver, and another branch with a normally closed valve leading from the air pipe into the top of the sludge receiver whereby compressed air can be admitted into the receiver to insure complete displacement therefrom of the excess solvent after reception of the sludge from one or the other of the two filters.

20. In a method of filtration of a water-immiscible solvent having a density greater than water and containing a quantity of filter aid, wherein said solvent is circulated upwardly through a main filter and wherein said main filter intercepts soil from said solvent in the form of filter aid sludge, the steps comprising periodically interrupting said circulation whereby a portion of said solvent drains downwardly through said main filter thereby sloughing off said filter aid sludge and dispersing said sludge in said solvent, whereupon resuming circulation said filter aid sludge is redeposited on said main filter, recovering said water-immiscible solvent from the filter aid sludge by back-washing the sludge from the filter under pressure through an auxiliary filter whereby the sludge is accumulated in said auxiliary filter, and passing water through the sludge in said auxiliary filter to displace solvent from the sludge, and thereafter separating the solvent and water phases.

References Cited in the file of this patent

UNITED STATES PATENTS

| | | |
|---|---|---|
| 654,965 | Franke | July 31, 1900 |
| 691,706 | Long | Jan. 21, 1902 |
| 1,947,873 | Norquist et al. | Feb. 20, 1934 |
| 2,286,432 | Monsarrat | June 16, 1942 |
| 2,547,277 | Marsh et al. | Apr. 3, 1951 |
| 2,630,694 | Creswick | Mar. 10, 1953 |